(12) United States Patent
Nishikawa

(10) Patent No.: US 6,227,322 B1
(45) Date of Patent: May 8, 2001

(54) ELECTRIC VEHICLE STRUCTURE

(75) Inventor: Masaharu Nishikawa, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/203,583

(22) Filed: Dec. 2, 1998

(30) Foreign Application Priority Data

Dec. 8, 1997 (JP) .................................................. 9-337398

(51) Int. Cl.⁷ .................................................. B60R 16/04
(52) U.S. Cl. .................................................. 180/68.5; 180/65.1
(58) Field of Search .................................................. 180/68.5, 65.1, 180/65.3

(56) References Cited

U.S. PATENT DOCUMENTS

| | | | |
|---|---|---|---|
| 5,392,873 | * 2/1995 | Masuyama et al. | 180/68.5 |
| 5,501,289 | * 3/1996 | Nishikawa et al. | 180/68.5 |
| 5,534,364 | * 7/1996 | Watanabe et al. | 429/61 |
| 5,555,950 | * 9/1996 | Harada et al. | 180/68.5 |
| 5,585,204 | * 12/1996 | Oshida et al. | 429/62 |
| 5,620,057 | * 4/1997 | Klemen et al. | 180/68.5 |
| 5,918,692 | * 7/1999 | Sekita et al. | 180/68.5 |
| 5,948,298 | * 9/1999 | Ijaz | 180/68.5 |

FOREIGN PATENT DOCUMENTS

| | | | |
|---|---|---|---|
| 194930 | * 5/1974 | (JP) | 180/68.5 |
| 2253873 | * 5/1974 | (DE) | 180/68.5 |
| 7-186733 | 7/1995 | (JP) . | |
| 9-104241 | 4/1997 | (JP) . | |

* cited by examiner

*Primary Examiner*—J. J. Swann
*Assistant Examiner*—James S. McClellan
(74) *Attorney, Agent, or Firm*—McDermott, Will & Emery

(57) ABSTRACT

A flange is provided upright on a top inner peripheral portion of an outer frame of a battery frame. The flange is formed inward with a gradient. A peripheral side wall of a battery cover is formed outward with a gradient to mate with an inclined angle of the flange. The peripheral side wall is taper-fitted onto the outer side surface of the flange via a sealing member and then engaged therewith. Accordingly, since no outward extended element is provided in the flange, the interference between the flange and the floor frame member is avoided and thus battery installing operability is improved.

17 Claims, 9 Drawing Sheets

ELECTRIC VEHICLE STRUCTURE

The contents of Application No. TOKUGANHEI 9-337398 filed on Dec. 8, 1997 in Japan is hereby incorporated by reference.

BACKGROUND OF THE INVENTION

The present invention relates to an electric vehicle structure.

In the electric vehicle, a vehicle-equipped battery occupies a considerable weight and an installation space. Therefore, in the related art, as disclosed in Patent Application Publication (KOKAI) Hei 9-104241, for example, a battery frame having an exclusive rigid structure is provided on a bottom surface of a floor of the vehicle body, and a plurality of batteries are installed in the battery frame.

The battery frame has an outer frame made of lightweight structure material such as aluminum extrusion material, etc. An upper surface of the outer frame is coupled opposedly to a floor frame member which is welded to a bottom surface of a floor panel, and then fastened/fixed thereto by bolts and nuts.

A waterproof battery cover for covering the battery compartment is provided onto the battery frame. The waterproof battery cover is made of synthetic resin material.

The outer frame of the battery frame has a flange standing upright on its upper side inner peripheral portion. The flange has a horizontal flange surface extending outward. The battery cover has a horizontal flange surface extending outward on a lower edge of its peripheral wall. These flange surfaces are superposed with each other, and sponge-like elastic material are interposed between the flange surfaces. Mutual flange surfaces are clamped/fitted by a fitting means such as a clip.

SUMMARY OF THE INVENTION

Both flange surfaces of the battery frame and the battery cover are extended outward horizontally, and mutual flange surfaces are superposed along the vertical direction and then fixed. Therefore, the flange is positioned in close to an inner peripheral wall of the floor frame member. As a result, when the battery frame is mounted to the vehicle body, the flange is apt to contact with the floor frame member.

To avoid such contact to the flange of the battery frame with the floor frame member, needs to expand the distance between the flange and the floor frame member. However, such structure need to use a reduced sectional width of the floor frame member, or a reduced opening area of the battery frame for the battery compartment. As a result, the reduced sectional width faces a lack of floor rigidity, and the reduced opening area makes a lack of the vehicle-equipped battery capacity.

Therefore, it is an object of the present invention to provide a battery frame structure of an electric vehicle, which is capable of avoiding contacts to the floor frame member and the flange of the battery frame, without reduction in the sectional width of the floor frame member and reduction in the opening area of the battery frame for the battery compartment, and also capable of fitting the flange and the battery cover in a watertight manner to be improved.

In order to achieve the above object, there is provided an electric vehicle structure of the present invention, comprising:

a floor frame member;
a floor panel on the floor frame member;
a battery frame including,
  an outer frame having side portions connected with the floor frame member on right and left sides and transverse portions connected with the side portions on front and rear sides, the outer frame partitioning a battery compartment; and
  a flange extending from an inner peripheral portion of the outer frame and having an upwardly inwardly inclined flange wall;
a battery cover over the battery compartment having a cover wall faced to the flange wall, the walls separable fitted to each other;
a sealing member between the flange and the cover waterproofing between the walls,
fixing member connecting the cover to the flange; and
at least one of batteries in the battery compartment.

According to the above structure, the flange has an upwardly inwardly inclined flange wall and the cover wall is faced to the flange wall. The flange wall and the cover wall are taper-fitted and then fixed by the fixing member. The sealing member for waterproofing between the flange and cover walls is provided between the flange and the cover.

Therefore, since no outward-extended element is provided on the flange, a degree of contacts to the flange and the inner peripheral wall of the floor frame member positioned below the floor panel can be reduced when the battery frame is mounted onto the bottom surface of the floor of the vehicle body.

As a consequence, contacts to the inner peripheral wall of the floor frame member and the flange of the battery frame can be avoided, nevertheless reduction in a sectional width of the floor frame member and reduction in an opening area of the battery frame for the battery compartment are not caused.

As a result, installing operability of the battery frame can be improved without reduction in floor rigidity and lack of the battery capacity.

In addition, since the flange and cover walls are taper-fitted and the sealing member for waterproofing between the flange and cover walls is provided between the flange and the cover, the waterproof property of the battery frame can be improved.

DESCRIPTION OF THE PREFERRED EMBODIMENTS

Figure 1:
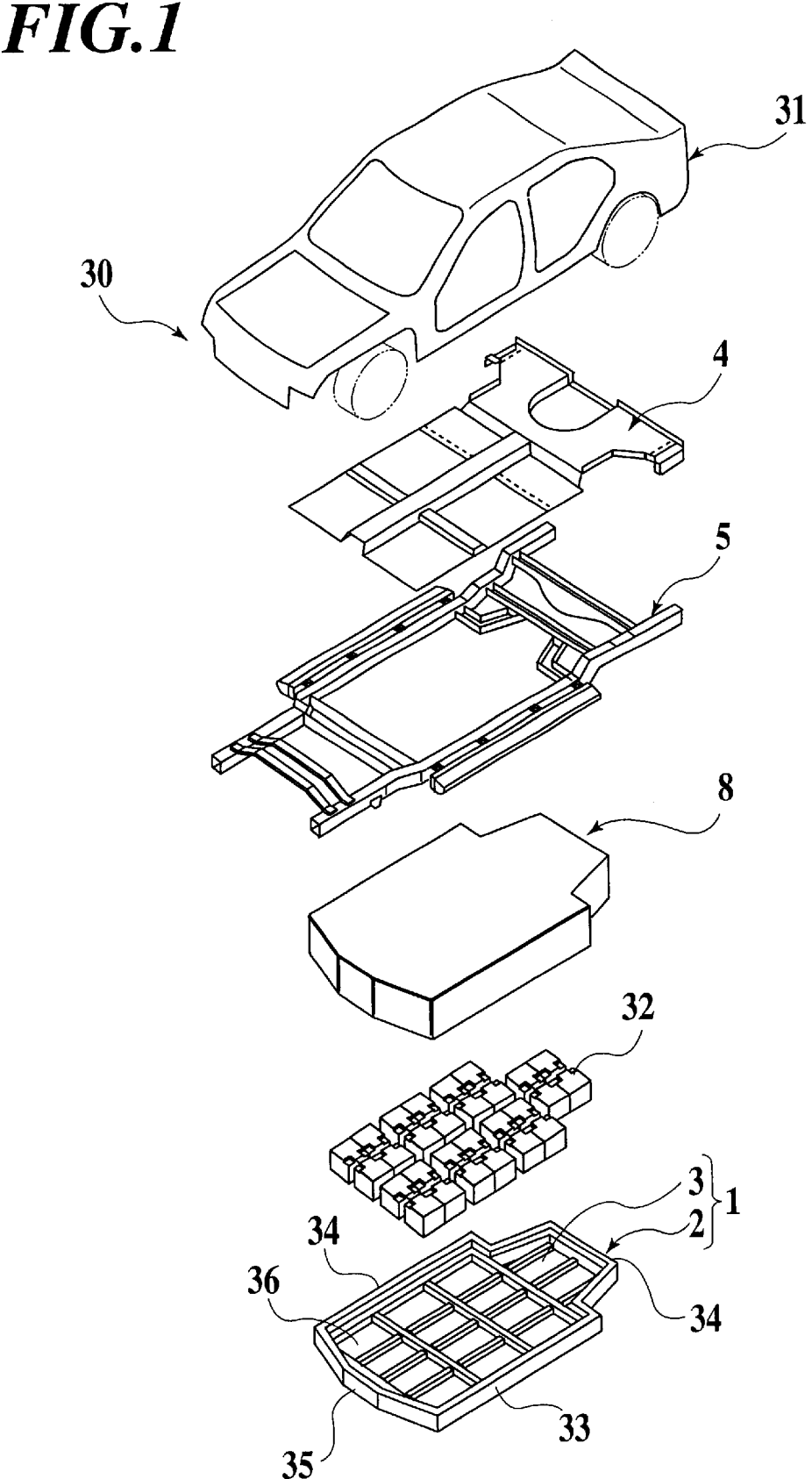
FIG. 1 is an exploded perspective of the present invention.

In a first embodiment, as shown FIG. 1, an electric vehicle 30 comprises a body 31, a floor panel 4, a floor frame member 5, a battery frame 1, a plurality of batteries 32, and a battery cover 8.

The battery frame 1 partitions a battery compartment 33 in which the batteries 32 are arranged. The battery frame 1 comprises an outer frame 2, and a metal bottom plate 3 for closing a bottom portion on the inside area of the outer frame 2. The outer frame 2 consists of side portions 33, 34 being positioned in the lateral direction, and transverse portions 35, 36 being positioned in the longitudinal direction.

Figure 2:
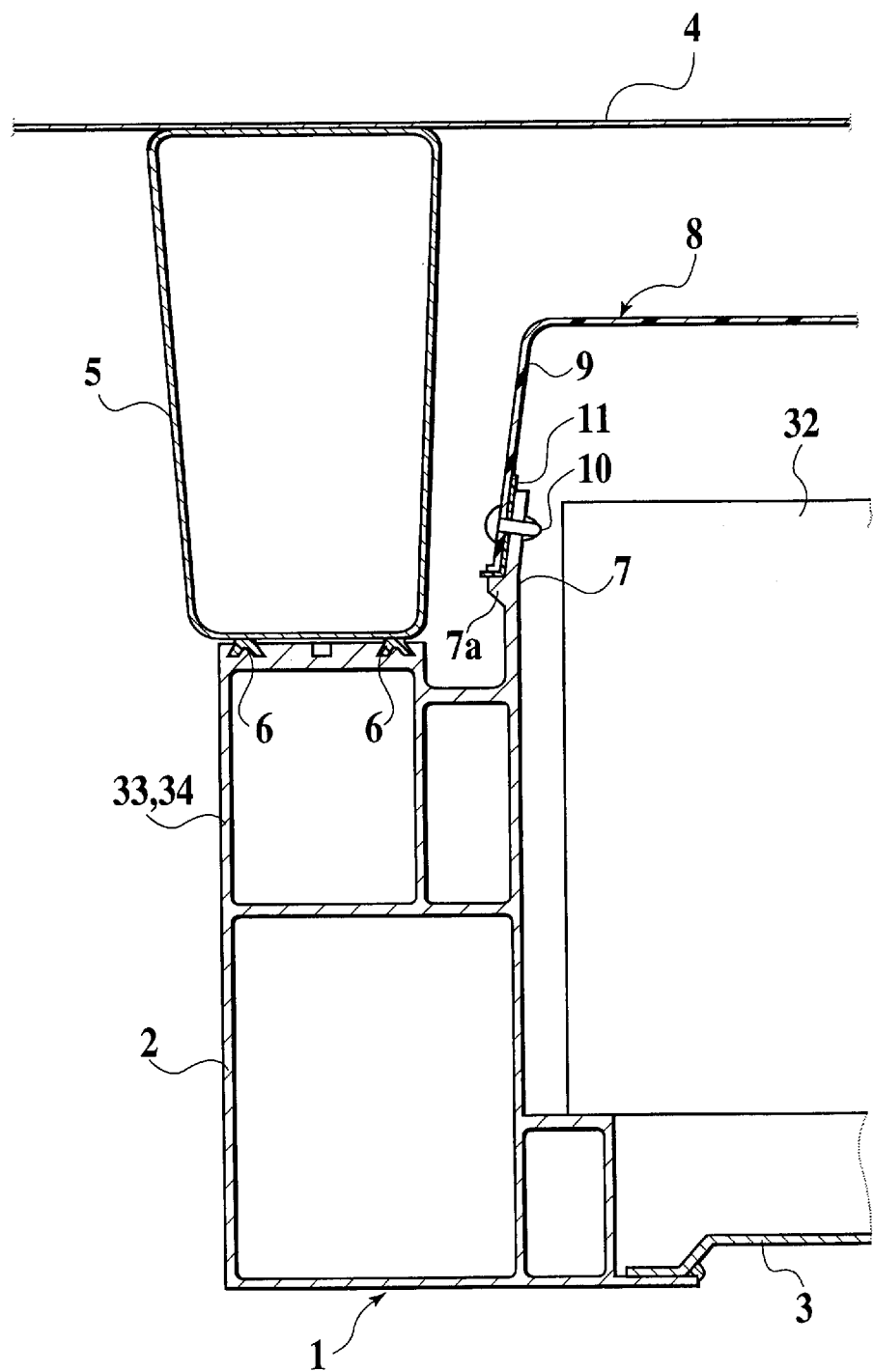
FIG. 2 is a sectional view of a first embodiment.

As shown in FIG. 2, the floor frame member 5 is positioned on a bottom surface of the floor panel 4, and then welded onto such bottom surface. Upper surfaces of the side portions 33, 34 and lower surfaces of the floor frame member 5 are coupled opposedly to each other via a plurality sheets of sealing members 6, and are coupled with each other attachably/detachably by bolts and nuts (not shown).

The outer frame 2 is formed of lightweight metal material such as aluminum alloy, for example, and has a closed rectangular sectional shape. The sealing members 6 are fitted onto the upper surface of the outer frame 2 and fixed thereto.

The outer frame 2 has a flange 7 formed integrally on its upper side inner peripheral portion. The flange 7 is protruded upward higher than an upper surface to which the sealing members 6 are to be fitted.

An almost upper half part (flange wall) of the flange 7 is inclined slightly toward the inside at an appropriate angle. The flange 7 has a stopper edge 7a, which extends toward the outer peripheral side, on its inward inclined portion. The battery cover 8 is fitted onto the stopper edge 7a.

The battery cover 8 is made of synthetic resin material, and covers an upper area of the battery compartment in which the batteries 32 are installed. The battery cover 8 has a planar shape to mate with a planar shape of the battery frame 1. The battery cover 8 has a peripheral side wall (cover wall) 9 which is inclined outward to mate with an inclined angle of the upper half part of the flange 7.

The battery cover 8 is covered and mounted onto the battery frame 1 before the battery frame 1 is mounted to the bottom side of the car body floor. More particularly, the peripheral side wall 9 is taper-fitted onto an outer side surface of the upper half part of the flange 7, then is positioned while rendering a lower edge of the peripheral side wall 9 to contact with the stopper edge 7a, and then is clipped and fixed by a clip (fixing member) 10. The clip 10 is passed through the peripheral side wall 9 and the flange 7. Elastic sealing member 11 is interposed into a tapered fitting portion between the peripheral side wall 9 and the flange 7. The elastic sealing member 11 is formed of independently foamed, sponge-like waterproof material.

According to this embodiment, the flange 7 has an upper half part which is inclined toward the inside. The flange 7 stands upright from an upper side inner peripheral portion of the outer frame 2 in the battery frame 1. The battery cover 8 has the peripheral side wall 9 which is inclined outward to mate with an inclined angle of the upper half part of the flange 7. Then, the peripheral side wall 9 of the battery cover 8 is taper-fitted to the upper half part of the flange 7 via the sealing member 11, and then clipped and fixed thereto by the clip 10. Therefore, since no outward-extended element is provided onto the flange 7, a degree of contacts between the flange 7 and the inner peripheral wall of the floor frame member 5 positioned below the floor panel 4 is reduced when the battery frame 1 is mounted onto the bottom surface of the floor of the vehicle body. As a consequence, interference between the inner peripheral wall of the floor frame member 5 and the flange 7 of the battery frame 1 can be avoided, nevertheless reduction in a sectional width of the floor frame member and reduction in an opening area of the battery frame for the battery compartment are not caused.

As a result, installing operability of the battery frame 1 can be improved without reduction in floor rigidity and lack of the capacity of the vehicle-equipped battery.

In addition, since the upper half part of the flange 7 of the battery frame 1 and the peripheral side wall 9 of the battery cover 8 are taper-fitted, they are tightly fitted inevitably. Hence, a sealing reaction of the sealing member 11 becomes substantially uniform over an entire periphery. The sealing member 11 is interposed between the upper half part of the flange 7 and the peripheral side wall 9. As a result, the waterproof property of the battery frame 1 can be improved.

In FIGS. 3 to 9, embodiments are shown where an outside portion of taper-fitted portions between a flange 7 of a battery frame 1 and a peripheral side wall 9 is covered with a film 20 in a watertight fashion. The film 20 is formed of a thin film resin material 21.

In the embodiments shown in FIGS. 3 to 9, a battery tray 12 constitutes the battery frame 1 in place of a bottom plate 3. The battery tray 12 is made of synthetic resin, and arranged to be fitted into the inner peripheral side of a outer frame 2. A flange 38 is formed upward on an upper peripheral portion 12a of the battery tray 12. An upper half part (flange wall) of the flange 38 is inclined inward. A clip (fixing member) 10 clips/fixes the peripheral side wall 9 of the battery cover 8 on/to the upper half part of the flange 38. In place of the floor frame member 5 having a closed sectional shape, a floor frame member 37 which has a hat-like sectional shape is provided.

Figure 3:
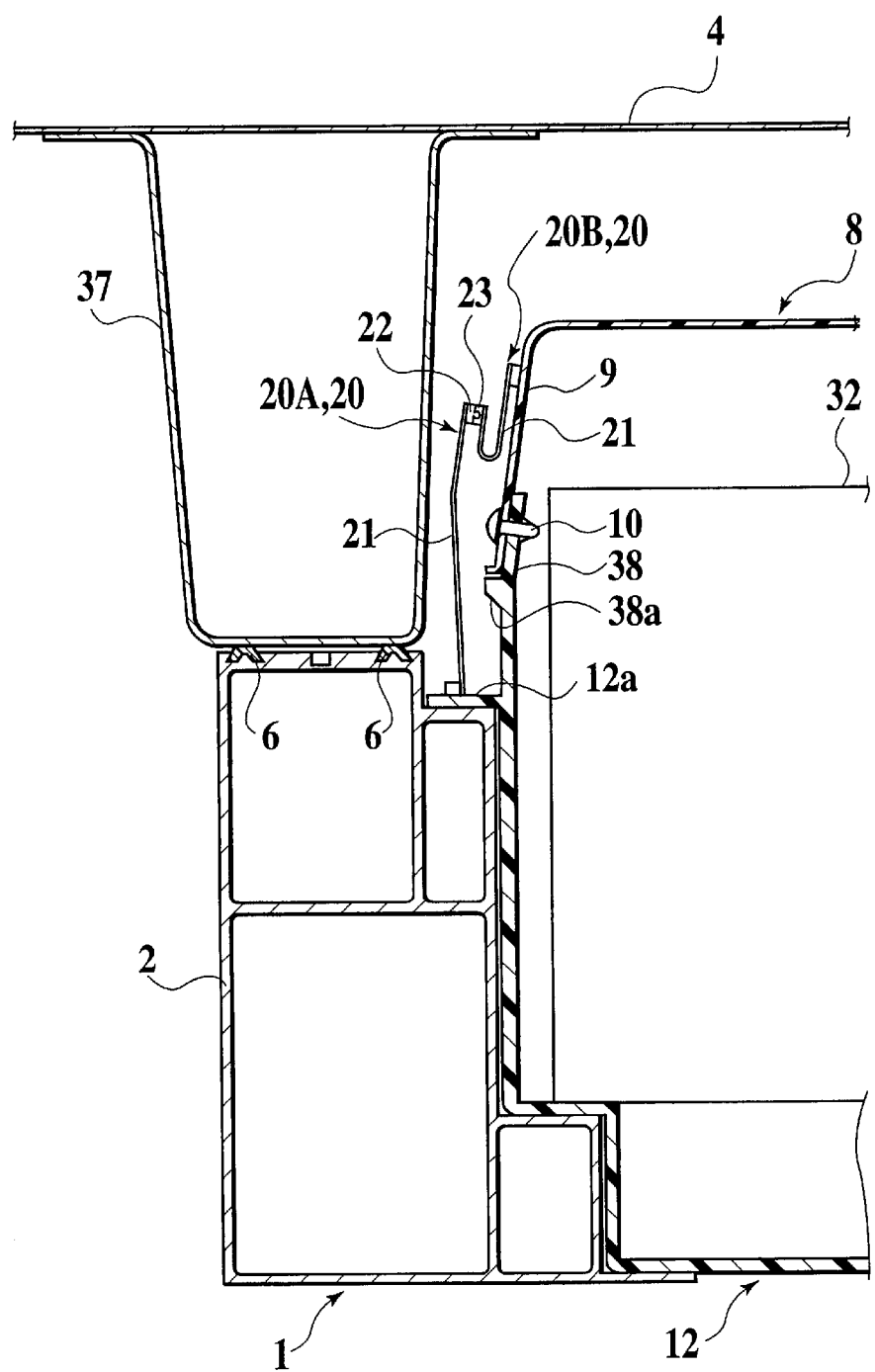
FIG. 3 is a sectional view of a second embodiment.

In a second embodiment shown in FIG. 3, a film 20 comprises a lower film 20A on frame side and an upper film 20B on cover side.

Both the lower and upper films 20A, 20B have a resin thin film material 21 respectively. One end of the resin thin film material 21 of the lower film 20A is thermo-compression-bonded or adhered to a rising base portion of the flange 38, i.e., an outer surface of the upper peripheral portion 12a of the battery tray 12. One end of the resin thin film material 21 of the upper film 20B is thermo-compression-bonded or adhered to an upper outer surface of the peripheral side wall 9 of the battery cover 8.

The film 20 has a fastener comprising fitting portions (lower and upper fitting portions) 22, 23. The fitting portions 22, 23 are provided to other ends of the resin thin film material 21, 21 of the lower and upper films 20A, 20B respectively. The fitting portions 22, 23 are fitted to each other under a sealing condition. The fitting portions 22, 23 are made of a synthetic resin stripe respectively.

After the peripheral edge portion of the battery cover 8 and the flange 38 of the battery frame 1 are taper-fitted and then clamped/fixed by the clip 10, the fitting portions 22, 23 provided to other ends of the resin thin film material 21, 21 are fitted to each other. Then, the resin thin film material 21 of the upper film 20B is folded upward. Thus, mutually fitted portions between the fitting portions 22, 23 are positioned higher than the fitted position between the peripheral side wall 9 and the flange 38 by the clip 10.

Therefore, according to this embodiment, the flange 38 of the battery frame 1 and the peripheral side wall 9 of the battery cover 8 are taper-fitted and then clipped/fixed by the clip 10. Hence, like the first embodiment, the flange 38 has no outward-extended element. Consequently, when the battery frame 1 is mounted onto the bottom surface of the floor of the vehicle body, a degree of contacts between the flange 38 and the inner peripheral wall of the floor frame member 5 is reduced. As a result, the interference between the inner peripheral wall of the floor frame member 5 and the flange 38 of the battery frame 1 can be prevented, without reduction in the sectional width of the floor frame member 5 and reduction in the opening area of the battery frame 1 for the battery compartment. In addition, battery installing operability can be improved without reduction in floor rigidity and lack of the capacity of the vehicle-equipped battery.

The film 20 having the resin thin film material 21 covers the fitted portion between the flange 38 of the battery frame 1 and the peripheral side wall 9 of the battery cover 8 in a watertight manner from the outside. Hence, infiltration of water from the fitted portion can be prevented sufficiently to thus make perfect the waterproof property of the battery frame 1.

Especially, in this embodiment, the film 20 is made up of the lower and upper films 20A, 20B each of which has the resin thin film material 21 and the fitting portion 22, 23. For this reason, a fitting operation of these fitting portions 22, 23 is easily carried out by pulling out these resin thin film material 21, 21 outward. In addition, these fitting portions 22, 23 are fitted at a position higher than the fitted portion between the flange 38 and the peripheral side wall 9. Therefore, even when water infiltrates via the coupled portion between the bottom surface of the floor frame member 5 and the top surface of the outer frame 2, the fitting portions 22, 23 positioned higher than the coupled portion can be prevented from being submerged under water to thus make perfect the waterproof property of the battery frame 1.

Figure 4:
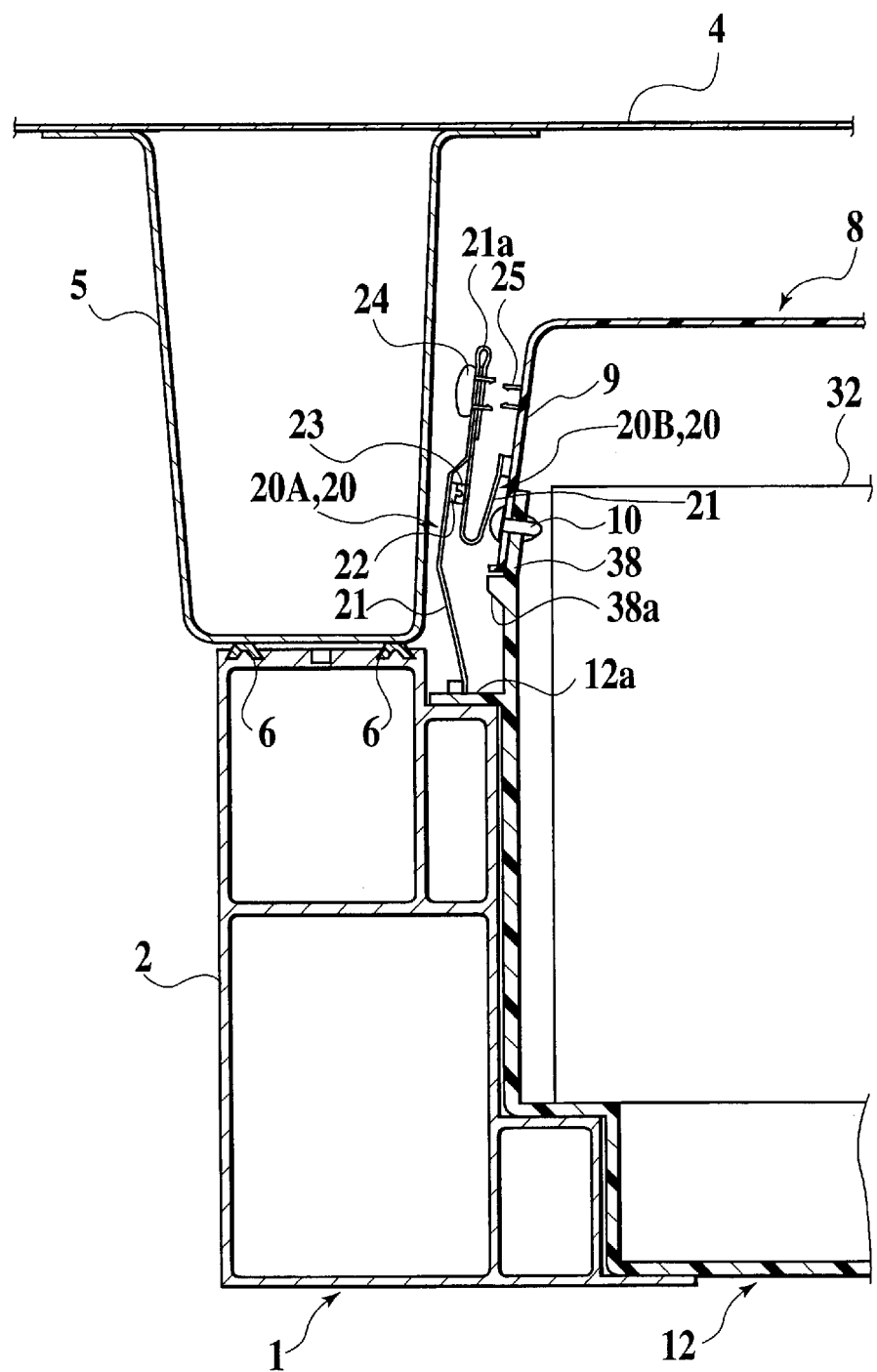
FIG. 4 is a sectional view of a third embodiment.

In a third embodiment shown in FIG. 4, using the film 20 of the second embodiment shown in FIG. 3 as a basic structure. Each of lower and upper films 20A, 20B has an extended portion 21a over each the fitting portions 22, 23.

The extended portions 21a, 21a of the resin thin film material 21 are fitted by fitting the fitting portions 22, 23 mutually. Then, the extended portions 21a, 21a are superposed, then folded, and fitted and fixed to the upper portion of the peripheral side wall 9 by a fixing means. For example, as the fixing means, a means comprising a plurality of clips 24 which penetrate through a folded area and a plurality of clip holders 25 which are projected from an outer upper surface of the peripheral side wall 9 of the battery cover 8 may be thought of.

According to this embodiment, the fitting portions 22, 23 which are fitted mutually are secured to the peripheral side wall 9 of the battery cover 8 so as not to suppress vibration, and also outward expansion of the resin thin film material 21, 21 is avoided. As a result, when the battery frame 1 is mounted onto the bottom surface of the floor of the vehicle body, the film 20 is in no way pulled into between the floor frame member 5 and the outer frame 2, so that an mounting operation of the battery frame 1 can be effected easily.

Figure 5:
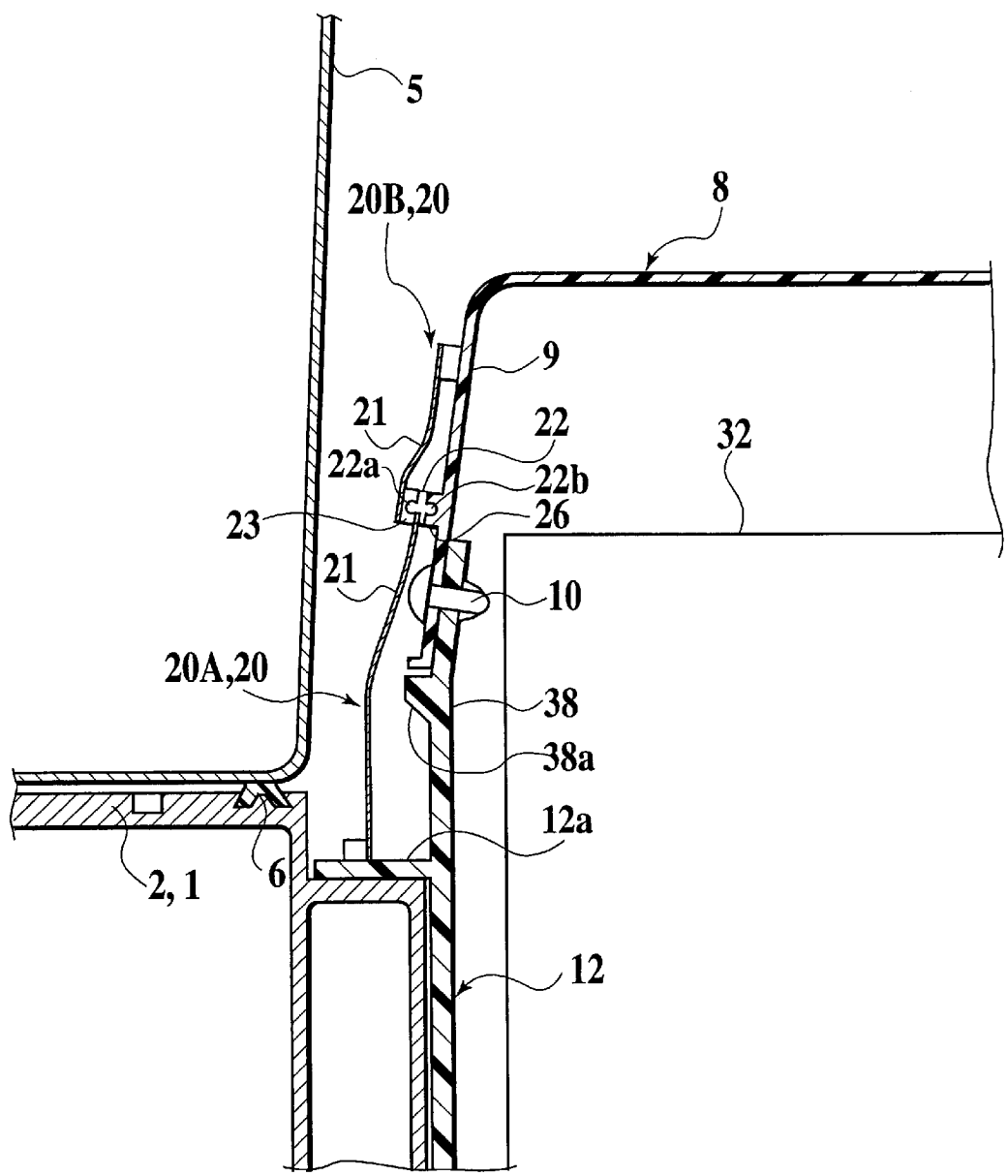
FIG. 5 is a sectional view of a fourth embodiment.
Figure 6:
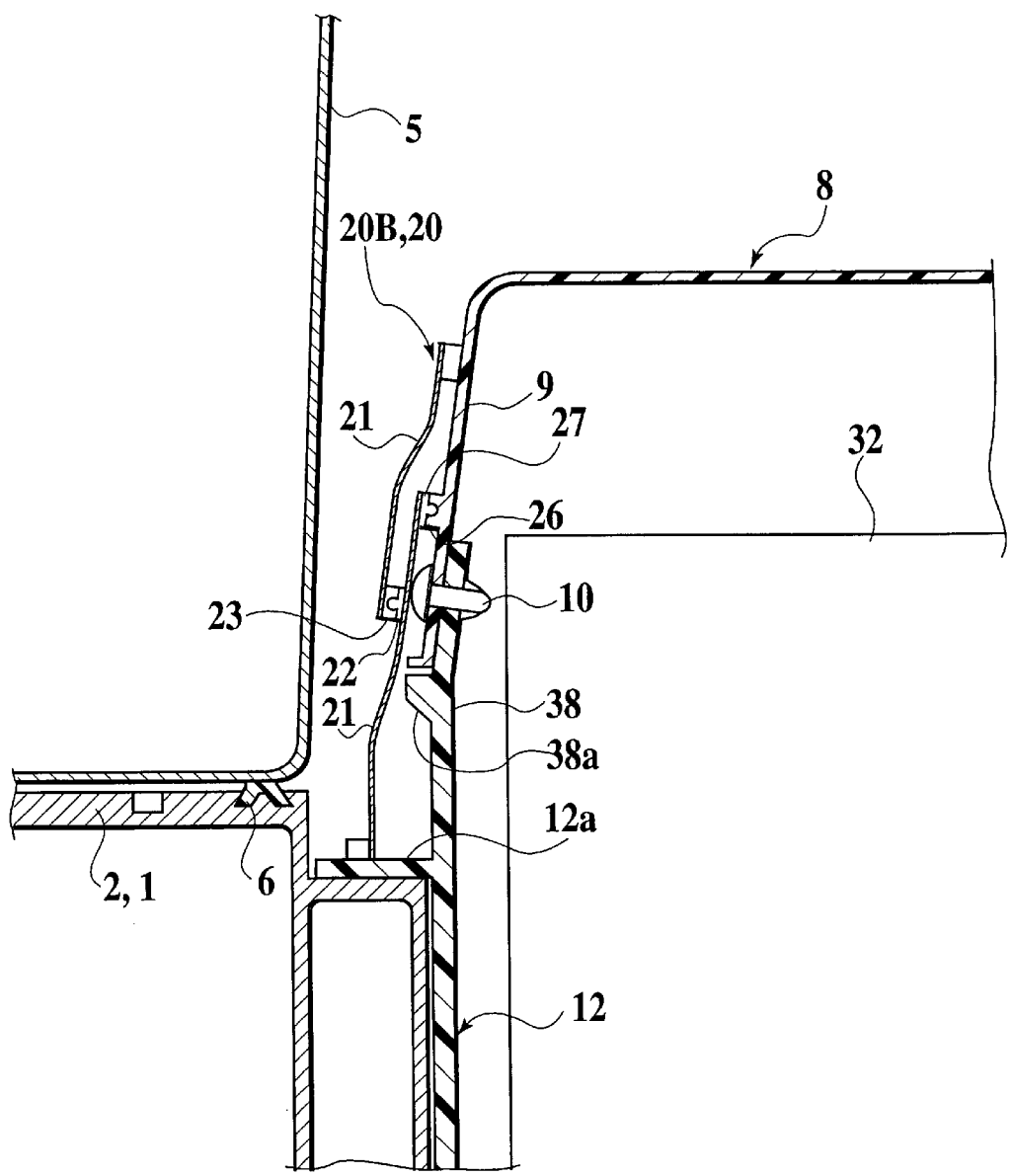
FIG. 6 is a sectional view of a fifth embodiment.

In a fourth embodiment shown in FIGS. 5 and 6, the structure of the second embodiment shown in FIG. 3 in which the film 20 consists of lower and upper films 20A, 20B each having a resin thin film material 21 and a fitting portion 22 or 23 is employed as a basic structure.

The fitting portion 22 provided on the other end of the lower film 20A has an engaging function on both front and back surfaces (lower fitting portion 22a and inside engaging portion 22b). The fitting portion 23 provided on the other end of the upper film 20B is fitted to the fitting portion 22a.

On an outer surface of a peripheral side wall 9 of a battery cover 8, a cover side engaging portion (outside engaging portion) 26 is formed integrally at a position higher than a fixed position of a flange 38 by the clip 10. The inside engaging portion 22b of the lower film 20A is fitted to the cover side engaging portion 26.

According to this embodiment, in the situation that the fitting portions 23, 22a are fitted to each other, the engaged portion 22b is engaged with the cover side engaging portion 26 on the peripheral side wall 9. Therefore, the fitting portions 22, 23 which fit the lower film 20A and the upper film 20B mutually is secured to the peripheral side wall 9 of the battery cover 8 so as not to suppress vibration, and also outward expansion of the resin thin film material 21, 21 is avoided. As a result, when the battery frame 1 is mounted, the film 20 is never pulled into between the floor frame member 5 and the outer frame 2, so that the mounting operation of the battery frame 1 can be effected easily.

As described above, in the fitting portion 22 of the lower film 20A, the fitting portion 22a is fitted to the fitting portion 23 and the engaging portion 22b is engaged with the engaging portion 26. In other words, multiple sealing is implemented and as a result sealing performance can be improved much more.

In a fifth embodiment shown in FIG. 6, an extended portion 21a of a lower film 20A is provided over a fitting portion 22, and an inside engaging portion 27 is provided to an end portion of a resin thin film material 21. On the outer surface of a peripheral side wall 9, a cover side engaging portion 26 is formed integrally at a position higher than a fixed position of a flange 38 by a clip 10. The engaging portions 26, 27 are engaged to each other on the back side of a resin thin film material 21 of an upper film 20B.

According to this embodiment, the inside engaging portion 27 of the lower film 20A is engaged to the cover side engaging portion 26 being formed on the peripheral side wall 9. Therefore, outward expansion of the resin thin film material 21, 21 is avoided and also vibration of the fitting portion 22, 23 is prevented. As a result, when the battery frame 1 is mounted, the film 20 is never pulled into between the floor frame member 5 and the outer frame 2, so that the mounting operation of the battery frame 1 can be conducted easily.

Also, since the engaging portions 26, 27 are engaged to each other on the back side of the upper film 20B and the fitting portions 22, 23 are fitted to each other, multiple sealing is achieved, and as a result sealing performance can be improved much more.

Figure 7:
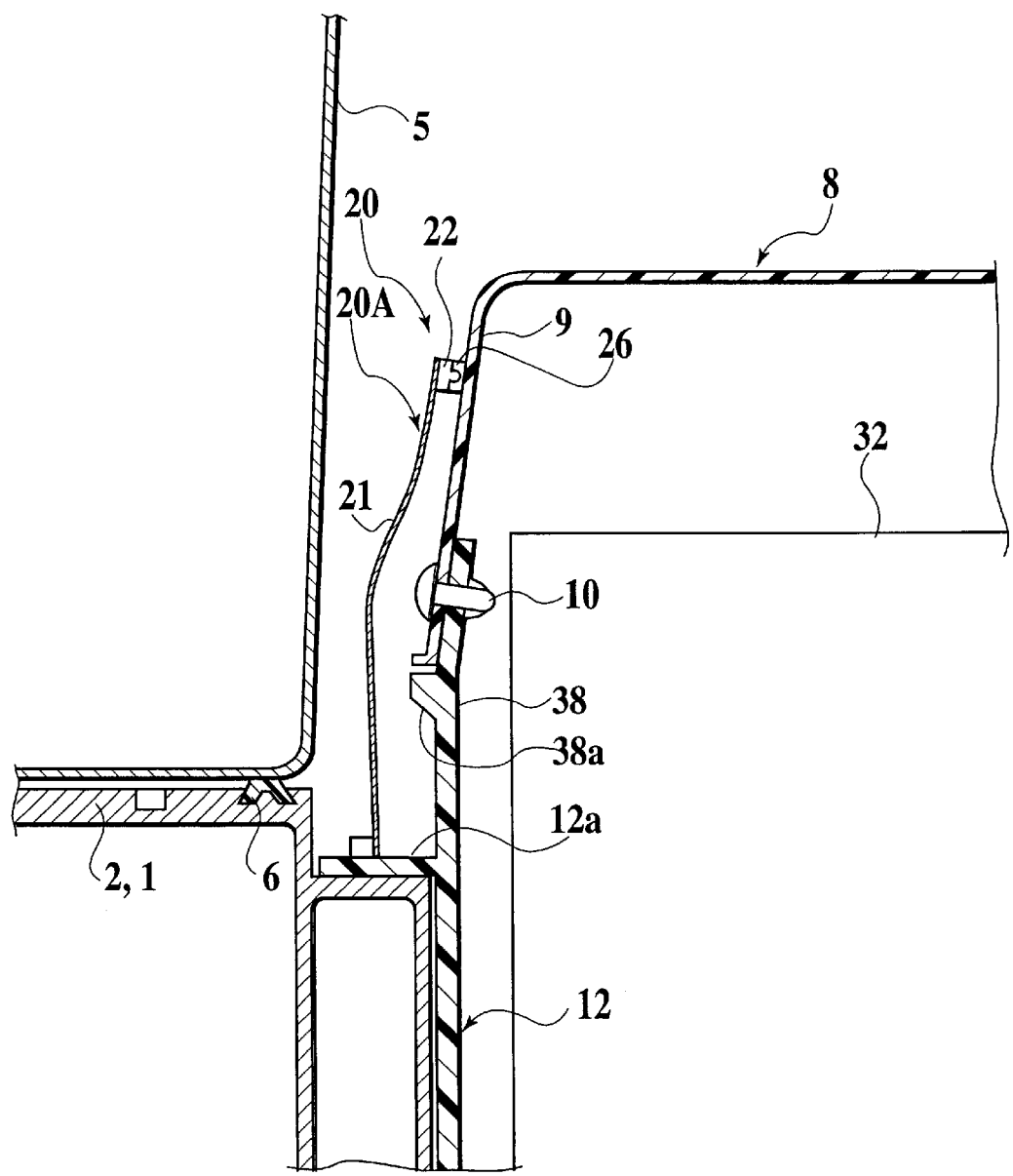
FIG. 7 is a sectional view of a sixth embodiment.

In a sixth embodiment shown in FIG. 7, a film 20 comprises a lower film 20A which has a resin thin film material 21 and a fitting portion 22, and a cover side engaging portion 26 as a upper fitting portion which is formed integrally on the outer surface of the peripheral side wall 9 and is fitted to the fitting portion 23.

As in the above embodiments shown in FIGS. 3 to 6, one end of the lower film 20A is thermo-compression-bonded or adhered to an outer surface of the upper peripheral portion 12a of the battery tray 12. Like the embodiments shown in FIGS. 5 and 6, the cover side engaging portion 26 is formed integrally with the peripheral side wall 9 at a position higher than a fixed position of the flange 38 by the clip 10.

According to this embodiment, the flange 38 of the battery frame 1 and the peripheral side wall 9 of the battery cover 8 are taper-fitted and then clamped/fitted by the clip 10. Hence, like the first embodiment shown in FIG. 2, no outward-extended element is provided to the flange 38, and consequently a degree of interference between the flange 38 and the inner peripheral wall of the floor frame member 5 is reduced when the battery frame 1 is mounted. As a result, even in the event that the sectional width of the floor frame member 5 and the opening area of the battery frame 1 are not reduced, the interference between the inner peripheral wall of the floor frame member 5 and the flange 38 of the battery frame 1 is avoided. Further, battery installing operability is improved without reduction in floor rigidity and lack of the capacity of the vehicle-equipped battery.

The outside of the fitted portion between the flange 38 of the battery frame 1 and the peripheral side wall 9 of the battery cover 8 is covered with the film 20 in a watertight fashion. The film 20 consists of the lower and upper films 20A, 20B each of which has the resin thin film material 21 and the fitting portion 22, 26. As a result, the waterproof property of the battery frame 1 can be made perfect. Particularly, the sealing position of the fitted portion between the fitting portion 22 and the cover side engaging portion 26 is set without fail at a position higher than the peripheral side wall 9 of the battery cover 8. Therefore, even when water infiltrates via the coupled portion between the bottom surface of the floor frame member 5 and the top surface of the outer frame 2, the fitting portions 22, 26 can be prevented from being submerged under water to thus make perfect the waterproof property of the battery frame 1.

Figure 8:
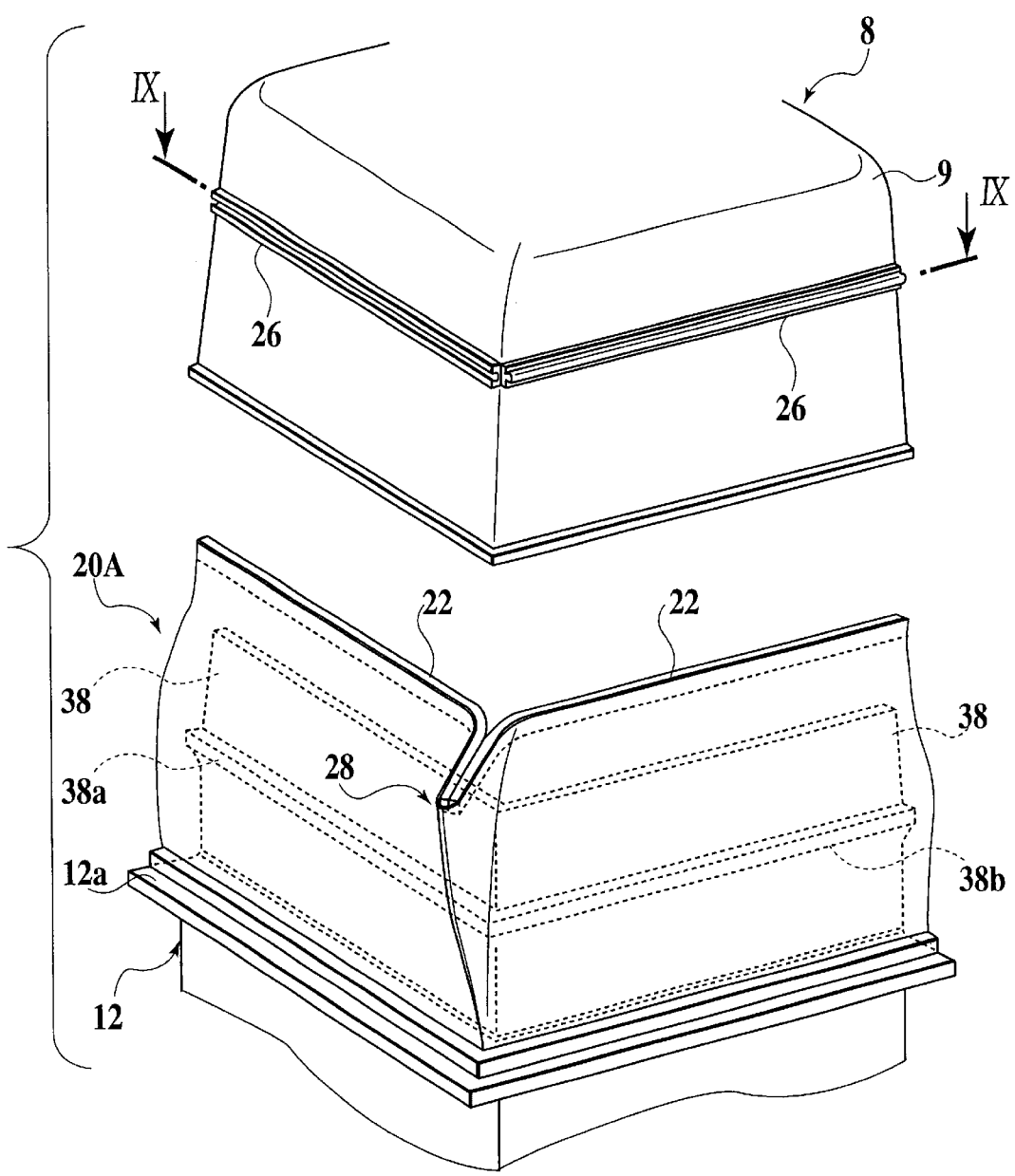
FIG. 8 is a perspective view of a seventh embodiment.
Figure 9:
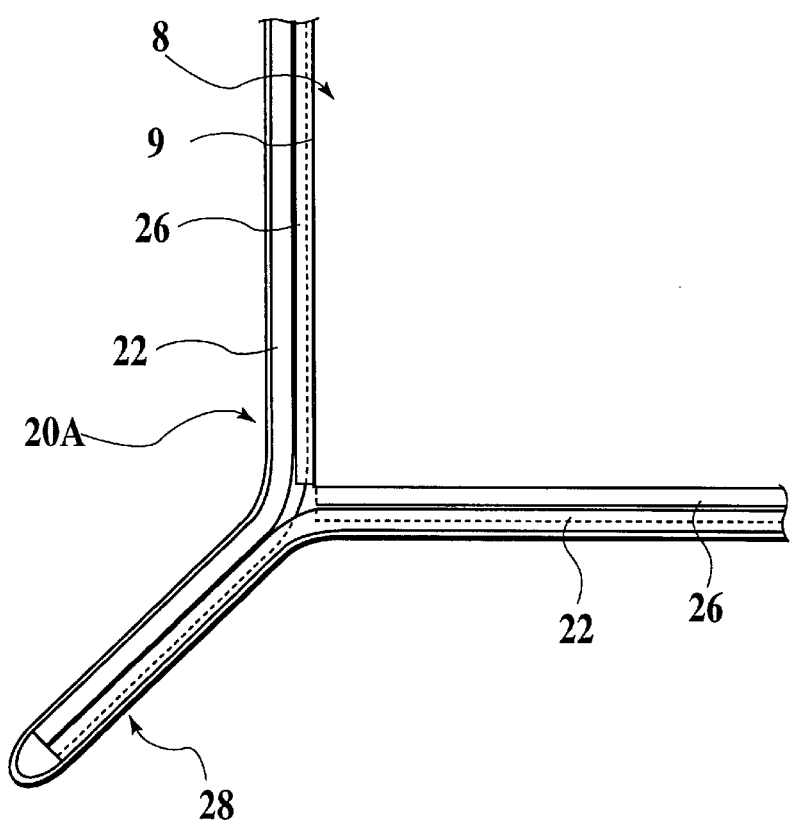
FIG. 9 is a sectional view taken along a line XI—XI in FIG. 8.

In a seventh embodiment shown in FIGS. 8 and 9, the structure of the sixth embodiment shown in FIG. 7, wherein a film 20 is made up of a lower film 20A which has a resin thin film material 21 and a fitting portion 22, and a cover side engaging portion 26 as a upper fitting portion which is formed integrally with a peripheral side wall 9 and is fitted to the fitting portion 22 is employed as a basic structure.

The fitting portion 22 of the lower film 20A and the cover side engaging portion 26 are fitted in a reverse relationship between the side portions placed on the longitudinal edge side and the transverse portions placed on the lateral edge side, which face to each other via respective corner portions of the battery frame 1.

For example, in a case that the cover side engaging portions 26 placed on the longitudinal edge side of the peripheral side wall 9 of the battery cover 8 are formed as a concave shape, the cover side engaging portion 26 placed on the lateral edge side are formed as a convex shape (male portion). In compliance with this, the fitting portions 22 placed on the longitudinal edge side of the lower film 20A are formed as a convex shape, and also the fitting portions 22 placed on the lateral edge side are formed as a concave shape (female portion).

Moreover, the lower film 20A has extra portions (male extra portions, female extra portions) 28 provided on respective corner portions of the battery frame 1. Such extra portions 28 are provided to absorb difference in peripheral length which is caused upon fitting the fitting portions 22, 22 which are formed continuously on the adjacent lateral edge sides.

According to this embodiment, the lower film 20A has extra portions 28 which are provided on respective corner portions of the battery frame 1 to absorb difference in peripheral length which is caused upon fitting the fitting portions 22, 22 being formed continuously on the adjacent lateral edge sides. Therefore, the difference in peripheral length between the peripheral side wall 9 of the battery cover 8 and the lower film 20A can be absorbed by the extra portions 28. Also, the fitting portion 22 of the lower film 20A can be fitted firmly onto the cover side engaging portion 26 over the overall periphery of the peripheral side wall 9. As a result, a sealing operation can be readily conducted and also the waterproof measure can be made perfect much more.

In this embodiment, since mutual fitting of the fitting portions 23 and mutual fitting of the fitting portion 22 and the cover side engaging portion 26 continue discontinuously, minute clearances are formed in the inside of the connected portions of the extra portions 28. However, sealing can be made completely by filling sealant into such discontinues areas.

In the above embodiments shown in FIGS. 3 to 9, as described above, the battery frame 1 is constructed by fitting/arranging the battery tray 12 made of synthetic resin to the inner peripheral side of the outer frame 2. For this reason, in case aluminum extrusion material is employed as the outer frame 2 and also a nickel-hydrogen battery is employed as the battery 32, there is a possibility that corrosion of the outer frame 2 caused by an alkali gas which is generated from the battery 32. However, since the inner peripheral area of the outer frame 2 is covered with the battery tray 12 made of synthetic resin, the problem of corrosion of the outer frame 2 can be overcome.

In addition, since the flange 38 on the upper inner peripheral portion of the outer frame 2 is formed integrally with the upper peripheral edge portion 12a of the battery tray 12, setting of the flange 38 can be easily carried out.

In case any one of the films 20 being disclosed after the second embodiment is to be added to the structure of the first embodiment shown in FIG. 2, adhesion of the resin thin film material 21 to the rising base portion of the flange 38, which is formed upright integrally with the upper inner peripheral portion of the outer frame 2, can be easily done by coating a resin layer onto the outer surface of the rising base portion of the flange 38.

What is claimed is:

1. An electric vehicle structure, comprising:
   a floor frame member;
   a floor panel on the floor frame member;
   a battery frame including,
      an outer frame having side portions connected with the floor frame member on right and left sides and transverse portions connected with the side portions on front and rear sides, the outer frame partitioning a battery compartment; and
      a flange extending from an inner peripheral portion of the outer frame and having an inclined flange wall extending toward the battery compartment;
   a battery cover over the battery compartment having an inclined cover wall matingly engageable with the inclined flange wall;
   a sealing member between the flange and the cover to provide waterproofing between the walls, and
   a fixing member connecting the cover to the flange.

2. The electric vehicle structure according to claim 1, wherein the sealing member is compressed between the walls.

3. The electric vehicle structure according to claim 1, wherein
   the sealing member comprises a film covering a fitting portion between the walls, and
   the film has a fastener permitting a separation of the cover from the flange.

4. The electric vehicle structure according to claim 3, wherein
   the film comprises lower and upper films,
   the fastener comprises lower and upper fitting portions separable hermetically fitted to each other,
   the lower film has the lower fitting portion and an adhering end portion to an outer surface of the flange, and
   the upper film has the upper fitting portion and an adhering end portion to an outer surface of the cover.

5. The electric vehicle structure according to claim 3, wherein
   the fastener arranged above an under edge of the cover wall.

6. The electric vehicle structure according to claim 4, wherein
the lower film is fixed to the outer surface of the cover.

7. The electric vehicle structure according to claim 6, wherein
the lower film has an extended portion from the lower fitting portion,
the upper film has an extended portion from the upper fitting portion,
the extended portions are overlapped and fixed to the outer surface of the cover.

8. The electric vehicle structure according to claim 6, wherein
the lower fitting portion arranged on an outside of the lower film,
the lower film has an inside engaging portion thereof,
the cover has an outside engaging portion thereof, and
the engaging portions are separable engaged with each other.

9. The electric vehicle structure according to claim 8, wherein
the lower fitting portion and the inside engaging portion are arranged back to back.

10. The electric vehicle structure according to claim 8, wherein
the lower film has an extended portion from the lower fitting portion, and
the inside engaging portion arranged on the extended portion of the lower film.

11. The electric vehicle structure according to claim 4, wherein
the lower film is made of resin and integrated with the outer surface of the flange, and
the upper film is made of resin and integrated with the outer surface of the cover.

12. The electric vehicle structure according to claim 3, wherein
the fastener comprises lower and upper fitting portions separable hermetically fitted to each other,
the film has the lower fitting portion and an adhering end portion to an outer surface of the flange, and
the upper fitting portion arranged on the outer surface of the cover.

13. The electric vehicle structure according to claim 12, wherein
the flange includes a side flange portion from one of the side portions and a transverse flange portion from one of the transverse portions,
the film includes a side film portion from the side flange portion and a transverse film portion from the transverse flange portion,
the lower fitting portion includes a male portion on one of the film portions and a female portion on the other of the film portions,
the male portion has a main portions for fitting to the upper fitting portion and a male remainder portion,
the female portion has a main portions for fitting to the upper fitting portion and a female remainder portion adjoining the male remainder portion, and
the remainder portions are fitted to each other.

14. The electric vehicle structure according to claim 1, wherein
the battery frame includes a resin battery tray, and
the flange is integrated with the battery tray.

15. An electric vehicle structure, comprising:
a floor frame member;
a floor panel on the floor frame member;
a battery frame including,
an outer frame having side portions connected with the floor frame member on right and left sides and transverse portions connected with the side portions on front and rear sides, the outer frame partitioning a battery compartment; and
a flange extending from an inner peripheral portion of the outer frame and having an inclined flange wall extending toward the battery compartment;
a battery cover over the battery compartment having an inclined cover wall matingly engageable with the inclined flange wall;
means for waterproofing between the walls, and
means for fixing the cover to the flange.

16. A method of waterproofing an electric vehicle, the vehicle having a floor frame member, a floor panel on the floor frame member, a battery frame partitioning a battery compartment under the floor panel and a battery cover, the method comprising the steps of:
providing a flange extending from an inner peripheral portion of the battery frame, the flange having an inclined flange wall extending toward the battery compartment;
providing a cover having an inclined cover wall matingly engageable with the inclined flange wall;
fitting the cover wall to the flange wall with the cover covering the battery compartment;
fixing the cover to the flange; and
providing a sealing member between the flange and the cover for waterproofing between the walls.

17. An electric vehicle structure, comprising:
a floor frame member;
a floor panel on the floor frame member;
a battery frame including,
an outer frame having side portions connected with the floor frame member on right and left sides and transverse portions connected with the side portions on front and rear sides, the outer frame partitioning a battery compartment; and
a flange extending upwardly from the outer frame at an angle other than a right angle to provide an inclined flange wall;
a battery cover over the battery compartment having an inclined cover wall matingly engageable with the inclined flange wall;
a sealing member between the flange and the cover to provide waterproofing between the walls, and
a fixing member connecting the cover to the flange.

* * * * *